Figure 1:
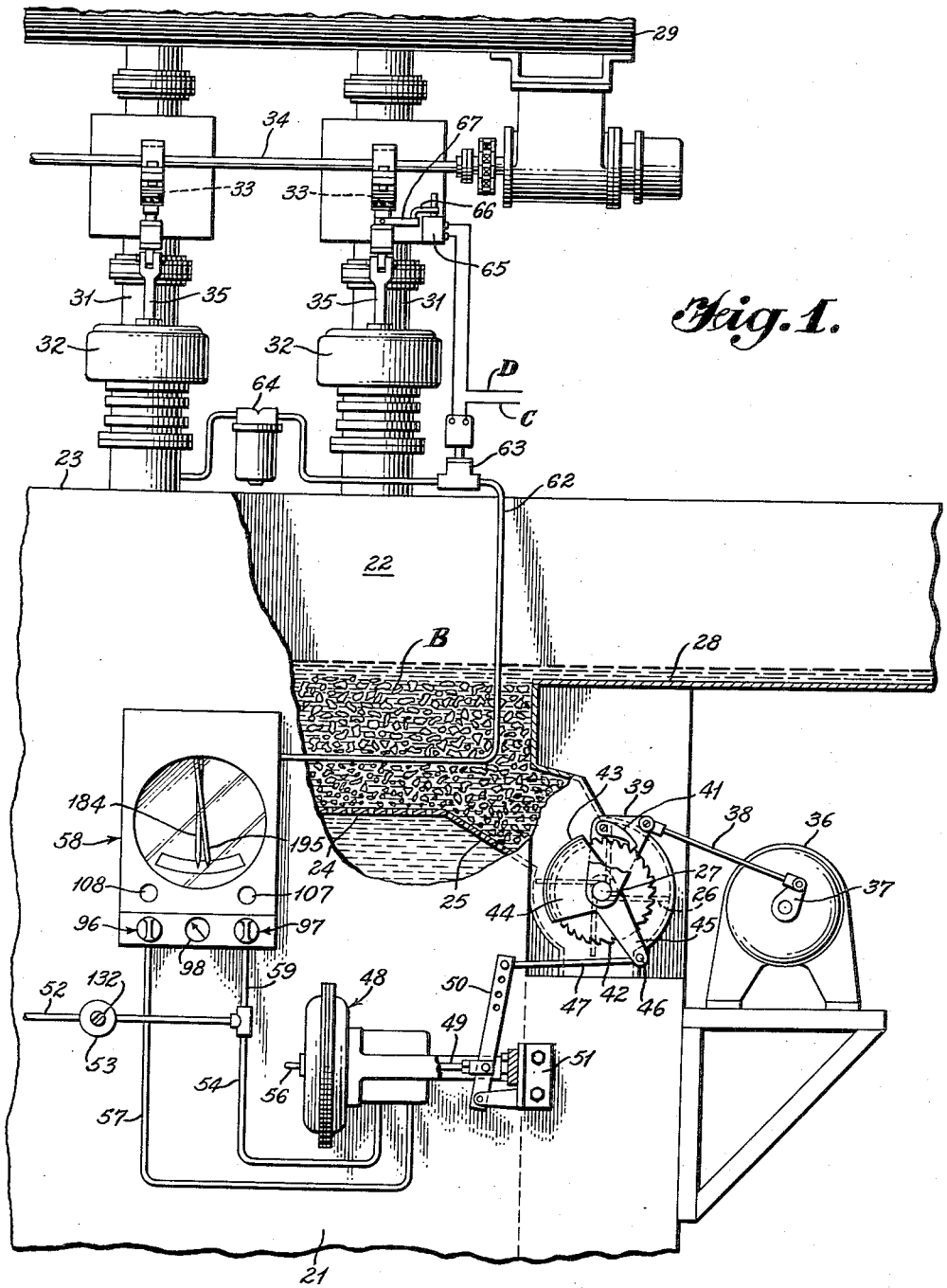

Sept. 30, 1958 C. M. KAZMIER ET AL 2,854,139
WASH BOX DISCHARGE CONTROL
Filed Nov. 17, 1955 8 Sheets-Sheet 1

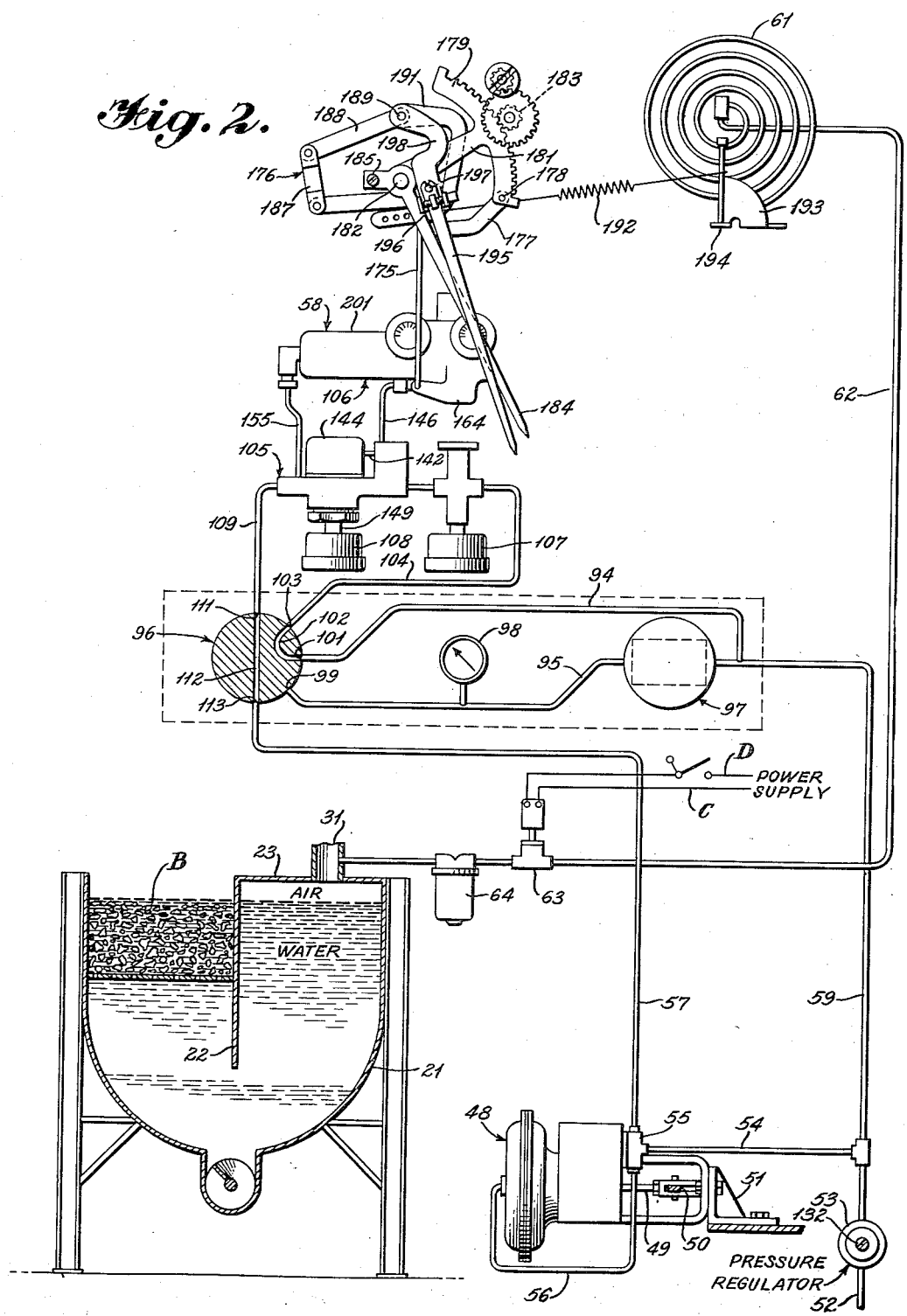

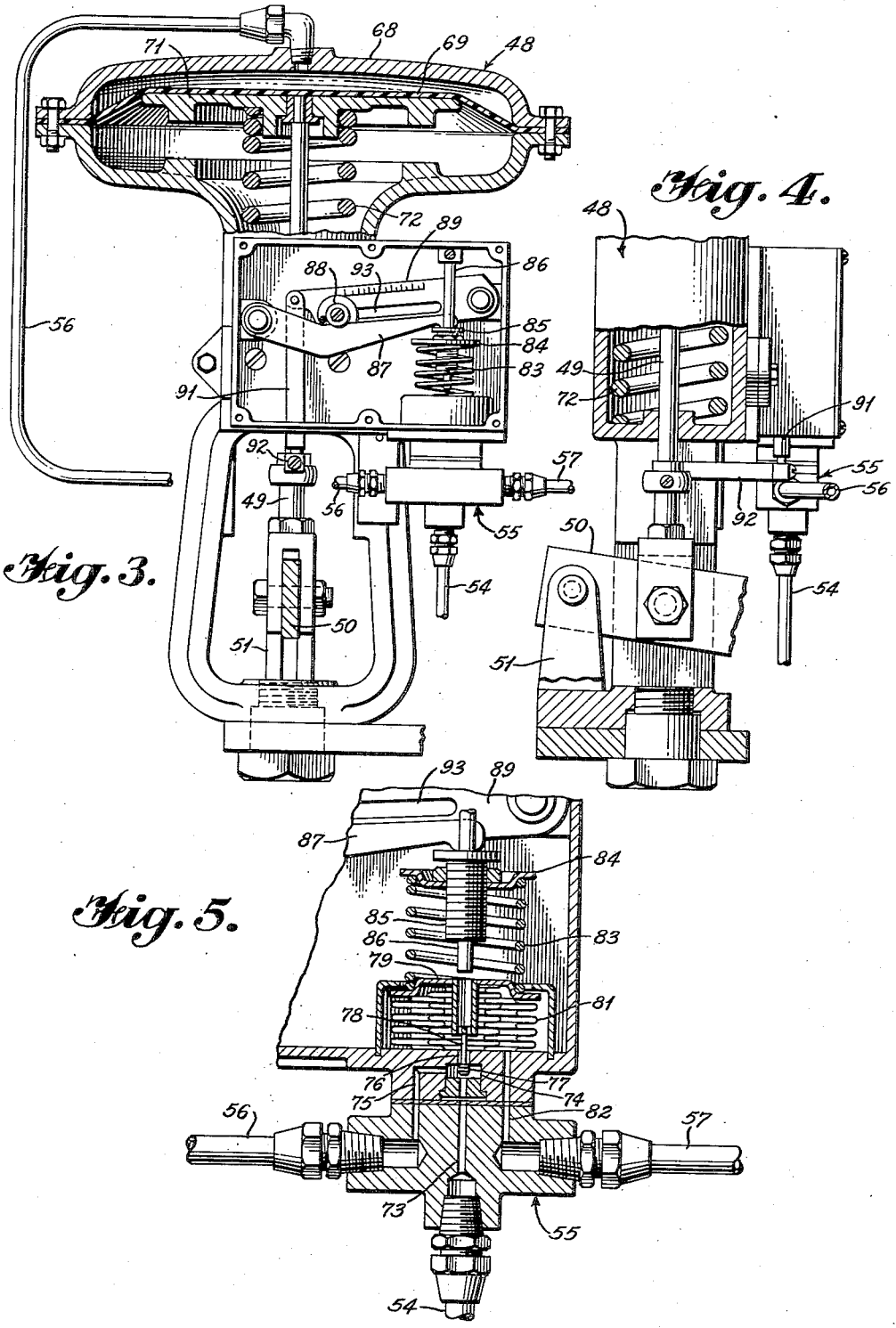

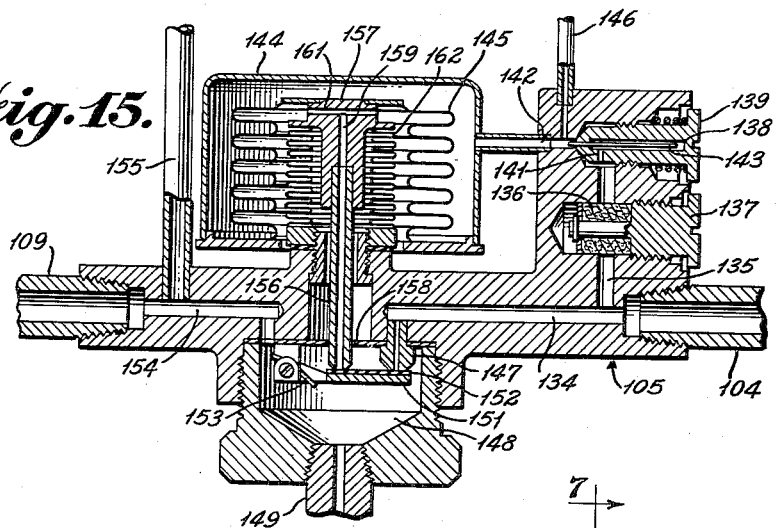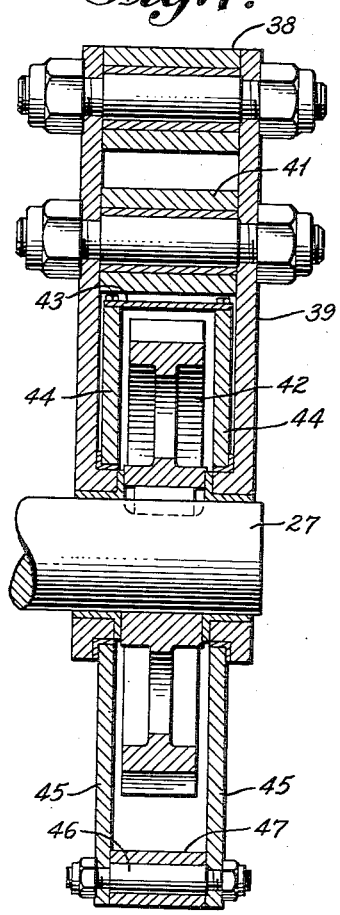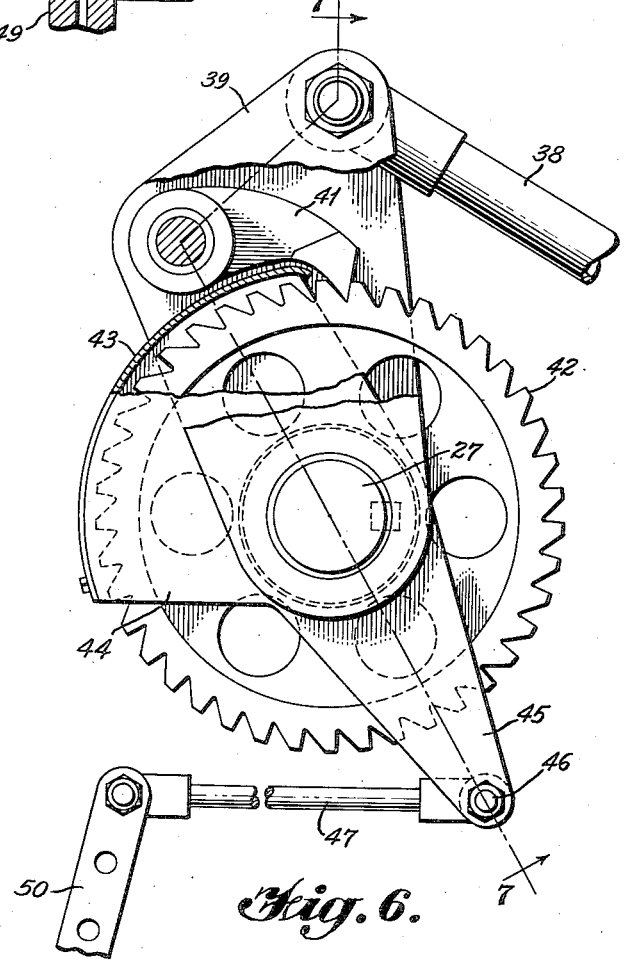

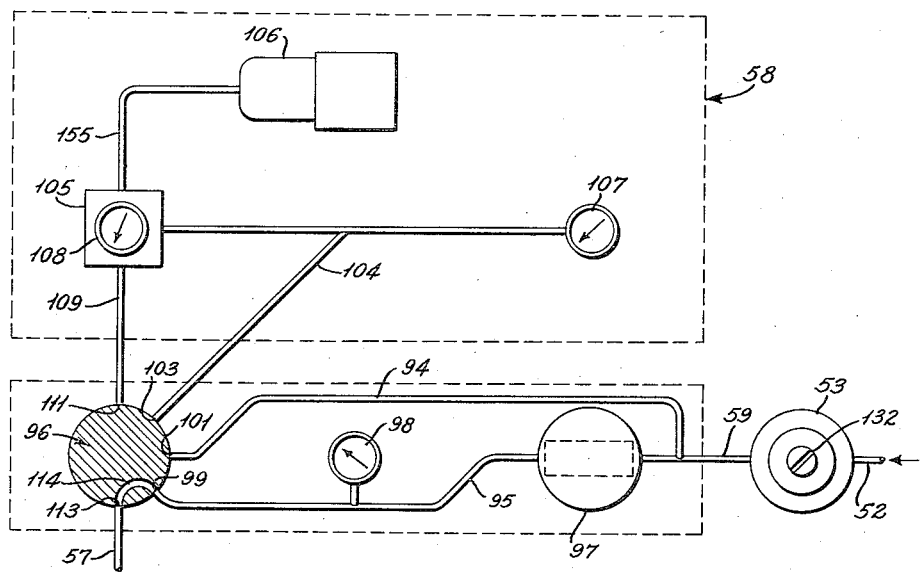
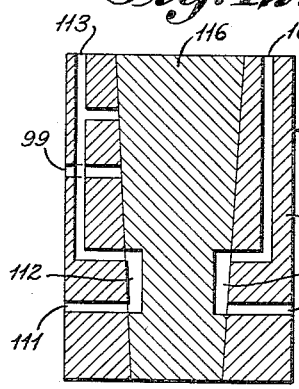
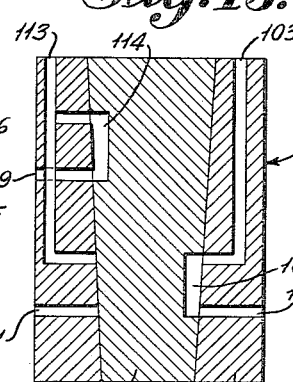
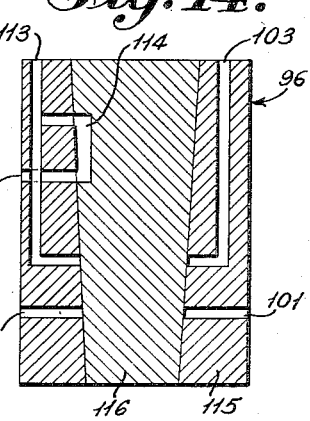
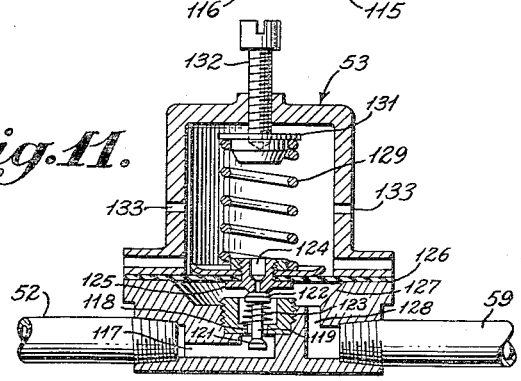

Sept. 30, 1958 C. M. KAZMIER ET AL 2,854,139
WASH BOX DISCHARGE CONTROL
Filed Nov. 17, 1955 8 Sheets-Sheet 7

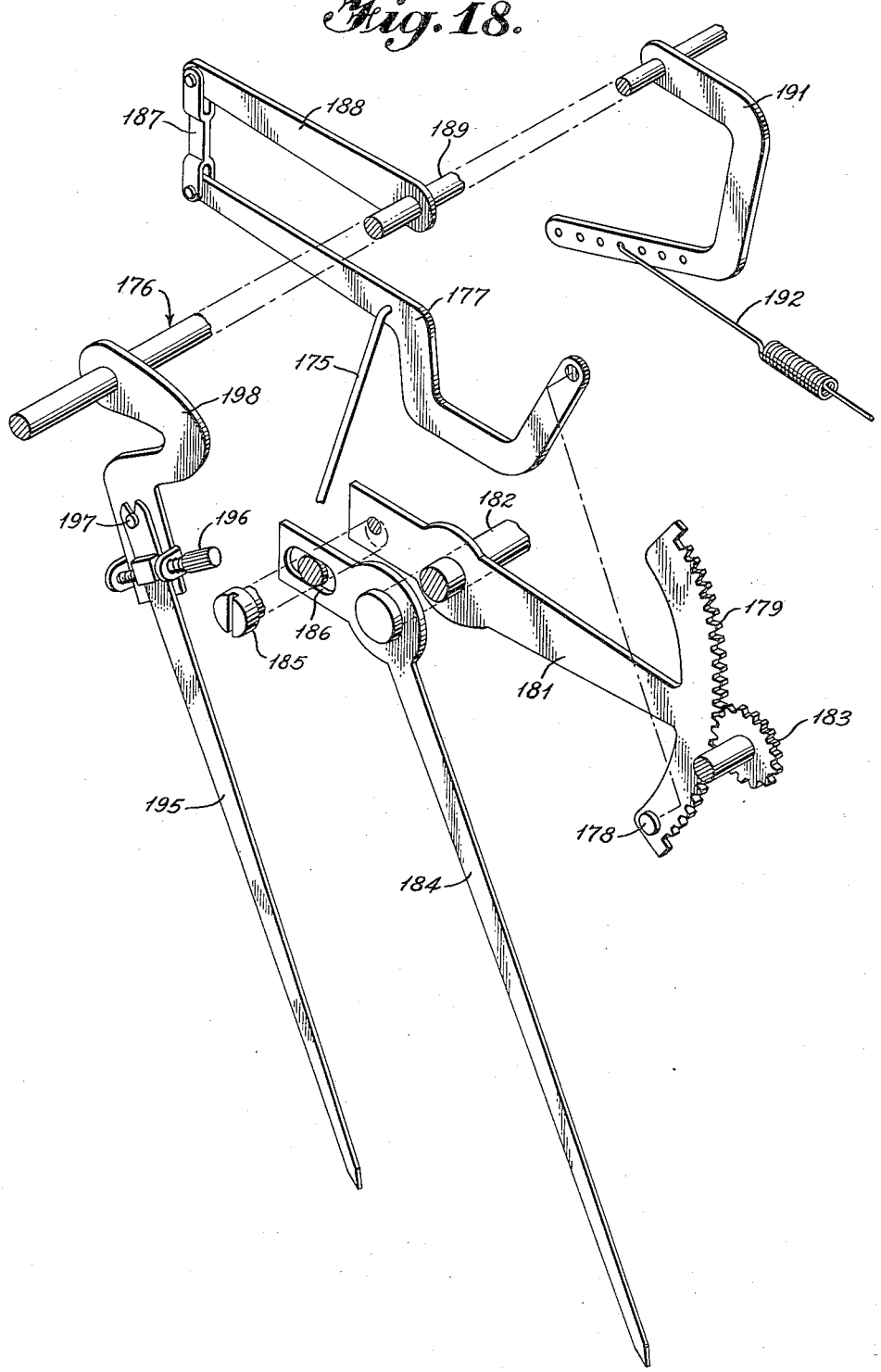

United States Patent Office 2,854,139
Patented Sept. 30, 1958

2,854,139

WASH BOX DISCHARGE CONTROL

Clarence M. Kazmier, Elmhurst, and Walter Carlson, Chicago, Ill., assignors to Link-Belt Company, a corporation of Illinois Application November 17, 1955, Serial No. 547,479

11 Claims. (Cl. 209—496)

This invention relates to new and useful improvements in wash box discharge controls and deals more particularly with an automatic discharge control for an air pulsated wash box which varies the rate of discharge of the high gravity stratum from the wash box in accordance with the pressure of the air in the box.

Coal and other minerals, normally processed in a wash box, contain widely varying amounts of extraneous materials, the specific gravities of which differ from that of the mineral being processed. The higher gravity particles, therefore, are separated from the remainder of the material and will accumulate in the bottom of the wash box at a rate which will vary considerably over a given period of time. It is conventional practice to discharge these higher gravity particles at a rate which varies in accordance with variations in the depth of the bed or stratum of such particles in the wash box.

Different types of control devices have been used in the past to effect variations in the rate of discharge of the higher gravity particles. For example, floats have been employed which were mounted for vertical movement in the material being processed at the level of the top of the stratum of higher gravity particles. Changes in the depth of the stratum, therefore, would cause movement of the float to effect changes in the rate of discharge of the higher gravity particles. Since the level of the top of the stratum generally varies across the bed, the float might assume a position which is inconsistent with the average depth of the stratum. Further, the float is subjected to abrasion and corrosion and, therefore, requires a substantial amount of maintenance.

Another known type of control for the discharge of the higher gravity particles has employed a pressure responsive device arranged to detect changes in the pressure of the washing fluid at the bottom of the bed of material in a wash box. Any change in the depth of the stratum of higher gravity particles effects a corresponding change in the back pressure or resistance to the flow of the washing fluid through the bed. Control of the discharge rate in accordance with the fluid pressure at the bottom of the bed, therefore, provides a fair degree of accuracy in maintaining the depth of the stratum of higher gravity particles at the desired value. The difficulty encountered with this type of control stems from the fact that some portions of the pressure responsive device must be located in the moving body of washing fluid where it is subjected to abrasion and corrosion. Further, the total pressure at any point in the washing fluid is affected by both the back pressure of the bed and the velocity of the fluid and it is difficult to isolate and measure the portion of the total pressure which is due to back pressure of the bed only.

It is the primary object of this invention to provide a control device for automatically regulating the rate of discharge of the higher gravity particles from a wash box in response to changes in the pressure of the air employed for pulsating the washing liquid in the box.

A further important object of the invention is to provide a wash box discharge control which will automatically regulate the rate at which the higher gravity particles are discharged and which is so arranged that no portion of the device is contacted by the material and washing liquid in the box.

Still another object of the invention is to provide an automatic control for the discharge of the higher gravity particles from a wash box which is easily maintained, readily adjusted, and affords a high degree of accuracy.

Other objects and advantages of the invention will be apparent during the course of the following description.

Figure 8:
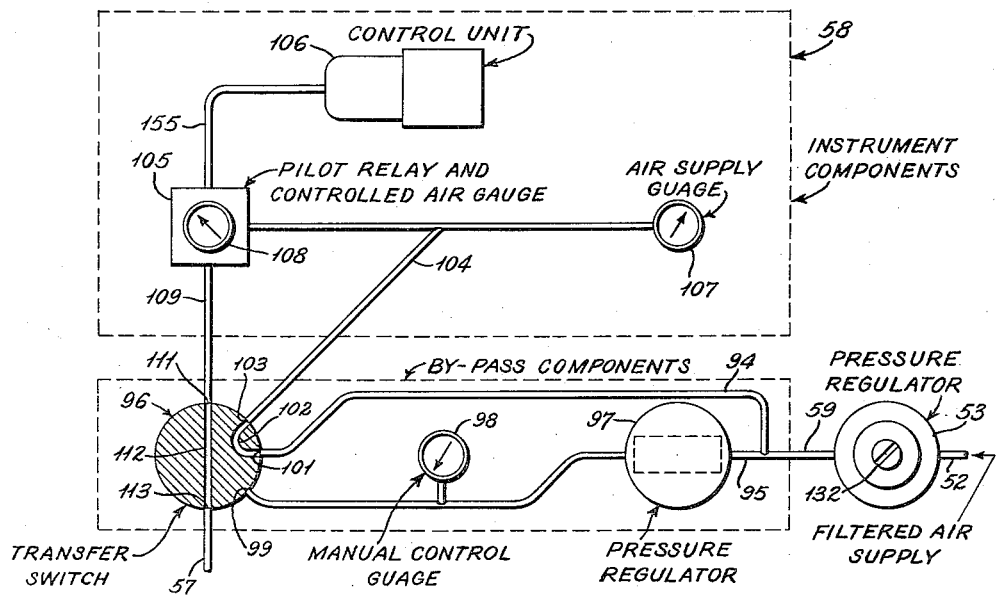
Figure 9:
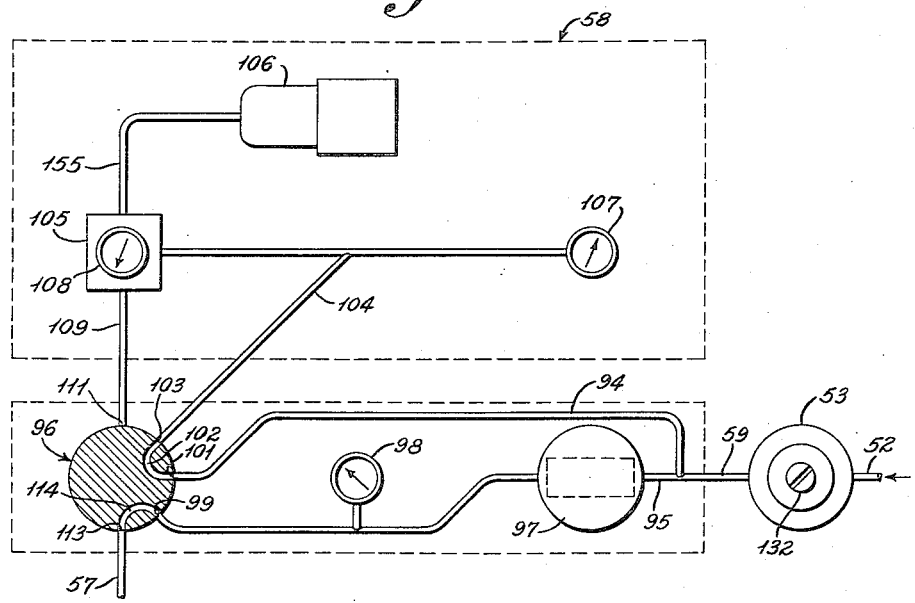
Figure 16:
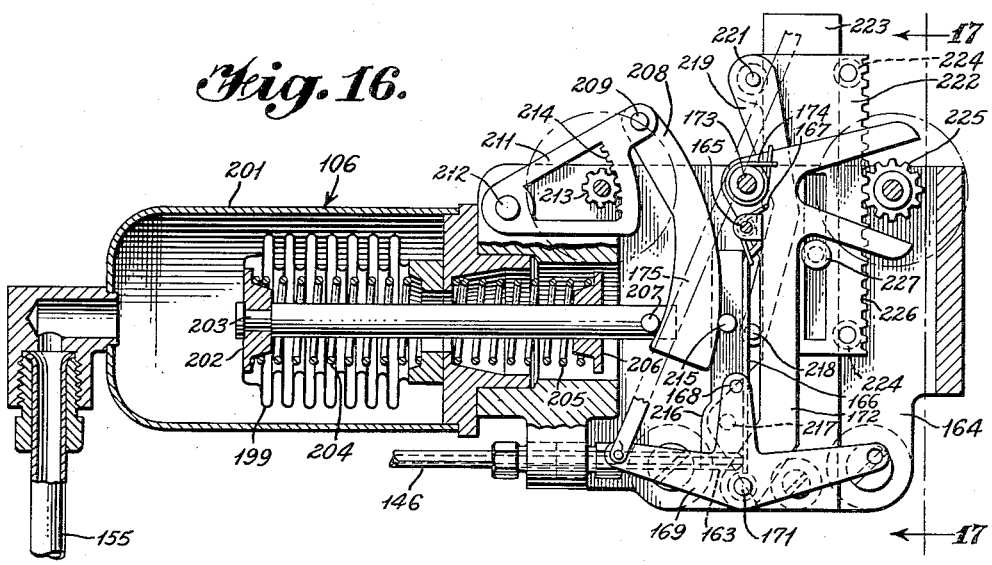
Figure 17:
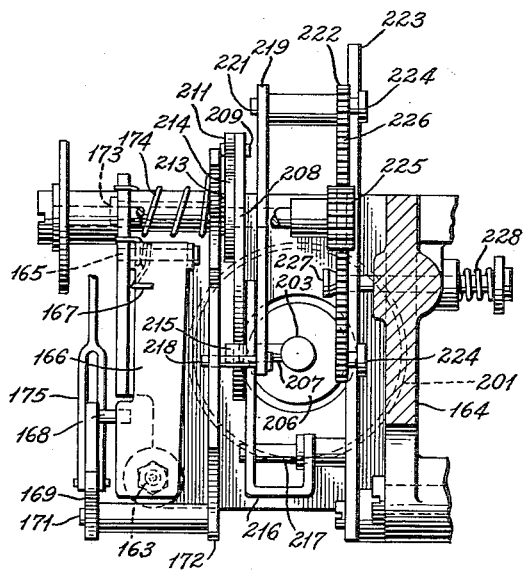

In the accompanying drawings forming a part of this specification and in which like reference characters are employed to designate like parts throughout the same, Figure 1 is a fragmentary elevational view, partly broken away, of the discharge end portion of a wash box embodying the invention, Figure 2 is a diagrammatic view of the control elements illustrated in Fig. 1 and a fragmentary, vertical sectional view of the wash box with which the control elements are associated, Figure 3 is an elevational view, partly in cross section, of the mechanism for adjusting the drive for the discharge gate, Figure 4 is a fragmentary, elevational view, partly broken away, showing the connection between the drive adjusting mechanism and its actuation controller, Figure 5 is a fragmentary, sectional view of the actuation controller for the drive adjusting mechanism, Figure 6 is a side elevational view, partly broken away, of the drive for the discharge gate, Figure 7 is a sectional view taken on line 7—7 of Fig. 6, Figure 8 is a schematic view showing the arrangement of and connections between the control elements within the control housing illustrated in Fig. 1 when the transfer switch is set for automatic operation, Figure 9 is a similar view to Fig. 8 but shows the transfer switch in a position for manual operation, Figure 10 is a similar view to Figs. 8 and 9 but shows the transfer switch in a position at which the associated control elements are disconnected for servicing, Figure 11 is a sectional view of one of the pressure regulators employed in the control system, Figure 12 is a sectional view of the transfer switch in the position illustrated in Fig. 8, Figure 13 is a sectional view of the transfer switch in the position illustrated in Fig. 9, Figure 14 is a sectional view of the transfer switch in the position illustrated in Fig. 10, Figure 15 is a detail sectional view of the pilot relay illustrated in Fig. 2, Figure 16 is a detail elevational view, partly in section, of the control unit illustrated in Fig. 2, Figure 17 is a vertical sectional view taken on line 17—17 in Fig. 16 and Figure 18 is an exploded view of the operating linkage for the control unit.

In the drawings, wherein for the purpose of illustration is shown the preferred embodiment of this invention, and first particularly referring to Figs. 1 and 2, there is shown a commercial form of washing jig that includes a wash box 21 which has its upper portion divided into front and rear sections by a longitudinally extending partition 22. These two sections of the wash box 21 are in open communication below the lower edge of the partition 22 which lies in spaced relation to the bottom of the wash box. A pressure tight cover 23 closes the top of the rear longitudinal section.

The front longitudinal section of the wash box 21 is provided with a material bed supporting screen 24 having a downwardly inclined end portion 25 which acts as a discharge chute. The lower end portion of the discharge chute 25 is enlarged and so formed as to receive a rotary discharge gate 26 mounted on and carried by a shaft 27, as illustrated in Fig. 1.

The end wall of the wash box 21 above the discharge chute 25 is provided with an exit sluice 28. An inlet sluice, not shown, similar to the exit sluice 28 may be utilized to introduce material to the opposite end portion of the wash box 21.

When the illustrated washing jig is in operation, the wash box 21 is provided with water up to the desired level. The pressure tight rear longitudinal section is connected to a compressed air receiver 29 through the air inlet pipes 31 which are provided with valves 32 that are operated simultaneously by the cams 33, rotated by the cam shaft 34, to impart reciprocating motion to the valve operating rods 35.

When the valve operating rods 35 are in their lower positions, the valves 32 permit compressed air to flow from the receiver 29 through the air inlet pipes 31 into the longitudinal section at the rear of the wash box 21. This compressed air forces water in the rear section downwardly under the lower edge of the partition 22 to force the water in the front section to rise through the screen 24 and the material bed B supported thereon. When the valve operating rods 35 are in their upper positions, the valves 32 act to close the air inlet pipes 31 and exhaust the compressed air from the rear longitudinal section. The water in the front section of the wash box 21 will, therefore, seek the level of the water in the rear section whereby the water in the front section passes downwardly through the material bed B and its supporting screen 24.

A starting mixture of mineral particles of different specific gravities and wash water is sluiced, or otherwise introduced, into the feed end of the front section of the wash box 21. The mineral particles will be advanced lengthwise of the front section by the longitudinal hydraulic flow through the wash box 21, the mineral particles of different specific gravities are stratified by the pulsations of the water so that the higher gravity particles are concentrated at the bottom of the material bed B and can be withdrawn through the discharge gate 26. The lower gravity particles will collect along the upper stratum of the material bed B and will spill into the exit sluice 28 with a certain amount of water during each pulsion stroke.

The above structural features of the washing jig are conventional and are more completely illustrated and described in Patent No. 2,609,098, issued to Charles W. Lotz on September 2, 1952, for Method of and Apparatus for Continuously Cleaning and Separating Minerals of Different Settling Rates.

The discharge gate 26 and its drive mechanism are of the general type illustrated and described in the patent to Edward J. Burnell et al., No. 2,106,204, dated January 25, 1938, and will be only briefly described as follows:

The motorized speed reducer 36 is connected to a suitable source of supply of electricity and is provided with a crank arm 37 having a connecting rod 38 pivoted to its outer end portion, as illustrated in Fig. 1. As is best illustrated in Figs. 1, 6 and 7, the other end portion of connecting rod 38 is pivotally connected to a radial arm 39 which is free to pivot about the shaft 27. The length of the radial arm 39 is greater than the length of the crank arm 37 so that rotation of the crank arm 37 acts through the connecting rod 38 to impart oscillatory motion to the radial arm 39. The radial arm 39 carried a pawl 41 which is urged, in any suitable manner, toward a position for engagement with the teeth of a ratchet wheel 42 that is keyed to the shaft 27. The oscillating motion of the radial arm 39, therefore, imparts an intermittent rotation to the discharge gate 26 which is carried by the shaft 27.

Control of the effective length of the intermittent rotary motion of the discharge gate 26, as illustrated in Figs. 6 and 7, is provided in the following manner:

An arcuately formed cover plate 43 is supported for movement between the teeth of the ratchet wheel 42 and the pawl 41 by spaced arms 44 which are arranged on opposite sides of the ratchet wheel 42 and between the ratchet wheel and the sides of the radial arm 39 and are supported for rotation about the shaft 27. Each of the arms 44 is provided with a radial extension 45 and the two radial extensions 45 are connected at their outer end portions by a pin 46 which also connects the two extensions to one end portion of an operating rod 47. Movement of the operating rod 47, therefore, will effect movement of the cover plate 43 to positions overlying a varying number of the teeth of the ratchet wheel 42 within the arcuate path of movement of the pawl 41. In this manner, the pawl 41 is held out of engagement with the ratchet wheel 42 during variable portions of its movement through each oscillation and the extent of movement of the ratchet wheel by each oscillation of the pawl is adjusted to provide the desired amount of intermittent rotary motion of the discharge gate 26.

The motorized speed reducer 36 is operated continuously during the periods of operation of the wash box 21. The rate of rotation of the discharge gate 26, however, is controlled by an automatic system which is responsive to the depth of the stratum of heavier particles that accumulates adjacent the material bed supporting screen 24. In other words, when the stratum of heavier particles increases in depth, the discharge gate 26 is operated at a faster rate or with a greater degree of rotation during each movement thereof to increase the discharge of heavier particles through the chute 25. When the depth of the stratum of heavier particles decreases, the cover plate 43 is adjusted to decrease the extent of movement of the gate 26 and the rate of discharge of material by the gate with the final result that the thickness of the stratum of heavier particles is maintained at a substantially constant value.

This invention provides for the above discussed control of the thickness of the stratum of heavier particles in response to changes in the pressure of the air employed to force the wash water through the material bed B as the thickness of the stratum of heavier particles varies. As was previously pointed out, the rate of discharge of heavier particles is adjusted by movement of the operating rod 47 to vary the position of the cover plate 43 and the desired control of the discharge rate is, therefore, accomplished by properly positioning the operating rod in accordance with the pressure of the air in the upper portion of the rear section of the wash box 21.

Referring now to Figs. 1 and 2 for a brief description of the complete system employed for controlling the operation of the discharge gate 26, reference character 48 designates a fluid motor having an operating plunger 49 pivotally connected to a lever 50 one end portion of which is pivotally mounted on a bracket 51 and the opposite end portion of which is pivotally connected to the operating rod 47. Movement of the operating plunger 49, therefore, will effect pivotal movement of the lever 50 on the bracket 51 to move the operating rod 47 and the cover plate 43 to their desired positions.

Compressed air for operating the fluid motor 48 is obtained from any suitable supply source, not shown, and flows through a tube 52, a pressure regulator 53 and a branch tube 54 to the actuation controller 55, see Fig. 2. The actuation controller 55 regulates the supply of air to the fluid motor 48 through the tube 56 in accordance with the pressure of the control air admitted to the actuation controller 55 through the tube 57.

The pressure of the control air in the tube 57 is regulated in accordance with the pressure of the air in the upper portion of the rear section of the wash box 21 by a control instrument, designated in its entirety by the reference character 58 which receives a supply of compressed air through the tube 52, pressure regulator 53 and branch tube 59 and which is operated by the responses of a pressure measuring device 61 to variations in the pressure in the air space in the upper portion of the rear section of the wash box. These pressure variations are transmitted to the device 61 through a tube 62, solenoid operated valve 63 and a trap 64 which removes water, oil and dirt from the air.

During the admission of compressed air to the enclosed upper portion of the rear section of the wash box 21, the pressure of the air in this space will vary in direct relationship with the resistance of the water to displacement beneath the partition 22 and upwardly through the material bed B. This back pressure or resistance to displacement, of course, will vary during each pulsion stroke of the water but, at a given point during successive pulsion strokes, the pressure will vary primarily in accordance with the thickness and, therefore, the hydraulic resistance of the material bed B to the flow of water therethrough.

In order to limit the responses of the control instrument 58 to only those changes in pressure at a given point during each pulsion stroke of the water, the solenoid operated valve 63 is actuated in timed relationship with the valves 32 through which air is admitted to the enclosed upper portion of the rear section of the wash box 21. The tube 62, therefore, defines a chamber which is in communication with the enclosed air space only during a very small portion of each pulsion stroke and the pressure of the air in the tube 62 will remain relatively constant and will vary only in accordance with the changes in the hydraulic resistance of the stratum of heavier particles in the bottom portion of the material bed B.

The timed actuation of the valve 63 in the manner described above is accomplished by a switch 65 which is so mounted that its operating lever 66 is engaged by the arm 67 carried by the valve operating rod of one of the valves 32. Since the movement of the valve operating rod 35 controls operation of the valve 32 and pulsation of the wash water, proper mounting of the arm 67 will provide for synchronization of the operation of the valve 63 with the pulsations of the wash water.

The solenoid operated valve 63 receives electrical energy from a power supply source through wires C and D the latter of which is connected to the solenoid valve through the limit switch 65.

From the above description of the complete control system, it will be readily apparent that changes in the depth of the stratum of heavier particles in the bottom portion of material bed B will effect changes in the pressure of the air in the enclosed upper portion of the rear section of the wash box 21 during like portions of successive pulsations of the wash water. These changes in the pressure of the air in the wash box 21 are applied through the tube 62 to the pressure measuring device 61 to cause the latter to respond to the changes and operate the control instrument 58 to vary the control air pressure in the tube 57. These changes in the control air pressure will in turn cause the actuation controller 55 to so regulate the fluid motor 48 as to adjust the rate of discharge of the gate 26 in a direction to return the depth of the stratum of heavier particles in the bottom portion of the material bed B to its desired value.

The above mentioned component parts of the complete control system will be described in detail as follows:

Referring now to Figs. 3, 4 and 5 for a detail description of the fluid motor 48 and its actuation controller 55, the tube 56 extends from the actuation controller 55 for communication with the chamber 68 in the upper portion of the fluid motor. One wall of this chamber 68 is formed by a flexible diaphragm 69 the inner surface of which is acted upon by the pressure of the air in the chamber. Positioned for engagement with the outer surface of the diaphragm 69 is a backing plate 71 which is connected to the operating plunger 49 of the motor 48 and is urged in a direction to oppose the pressure of the air in the chamber 68 by a spring 72. Pressure of the air in the chamber 68, therefore, is balanced against the force exerted by the spring 72 so that the operating plunger 49 will assume a different position for each change in the pressure of the air within the chamber. In other words, an increase in the pressure of the air within the chamber 68 will cause the operating plunger 49 to move the lever 50 in a direction to increase the effective length of throw of the pawl 41 and the rate of rotation of the discharge gate 26. Conversely, a decrease in the pressure of the air within the chamber 68 will cause a decrease in the rate of rotation of the discharge gate 26. A constant pressure within the chamber 68 will cause the rate of rotation of the gate 26 to be maintained at a corresponding value.

As is best illustrated in Fig. 5, the compressed air flowing to the actuation controller 55 through the tube 54 enters a passageway 73 for flow into a pilot valve chamber 74. A second passageway 75 provides communication between the chamber 74 and the tube 56 for maintaining the pressure within the tube 56 and the chamber 68 of the fluid motor 48 at a value equal to that of the air within the chamber 74. A venting port 76 is provided for the chamber 74 at a point directly opposite the passageway 73. Mounted within the chamber 74 is a valve 77 which is carried by a valve stem 78 extending through the exhaust port 76 for movement of the valve between seated positions across the passageway 73 and the venting port 76. The outer end portion of the valve stem 78 is connected to the closure plate 79 of an annular or double walled pressure bellows 81 the interior of which is an open communication with the tube 57 through the passageway 82. A balance spring 83 is compressed between the outer surface of the closure plate 79 and a collar 84 which is carried by a flanged bushing 85 for movement along the rod 86. The bushing 85 is externally threaded to permit adjustment of the collar 84 axially of the bushing.

As illustrated in Fig. 3, the outer end surface of the bushing 85 is engaged by the free end of a pivotally mounted arm 87 which is held in engagement with the end surface by a roller 88 that is adjustably mounted on a second arm 89. One end of the arm 89 is pivotally supported adjacent the free end of the arm 87 and its other end is pivotally connected to the link 91 which is in turn connected to the operating plunger by a second link 92.

Referring now to Figs. 3, 4 and 5 for a detail description of the operation of the fluid motor 48 and its actuation controller 55, and recalling that the compressed air flowing through the tube 54 will be maintained at a substantially constant pressure by the pressure regulator 53, the pressure of the air in the chamber 74 will be varied according to the position of the valve 77. In other words, when the valve 77 is moved toward the passageway 73 and away from the venting port 76, the flow of air through the passageway 73 is restricted and the flow of air from the venting port 76 is increased so that the pressure in the chamber 74 will be reduced. On the other hand, movement of the valve 77 toward the venting port 76 and away from the passageway 73 will increase the flow of air into the chamber and will restrict the venting of the air therefrom so that the pressure in the chamber will be increased. When the pressure of the air in the chamber 74 is increased or decreased, air will flow into or out of, respectively, the chamber 68 of the fluid motor 48 through the tube 56 and the passageway 75 and the diaphragm 69 will assume a position at which the pressure of the air acting on one side thereof is balanced by the force of the spring 72. It will be readily apparent, therefore, that for each position of the valve 77 there will be a corresponding position for the diaphragm 69 and the operating plunger 49 which moves with the diaphragm. The position of the operating plunger 49 which corresponds to a given position of the valve 77, however, may be adjusted in two different respects, as will be later described.

Since the valve 77 is connected to the closure plate 79 of the bellows 81, the valve will be moved by any condition of unbalance between the forces exerted on the closure plate by the compressed air within the bellows 81 and by the spring 83. Assuming that the valve 77 is in a stationary position with the forces exerted on the closure plate 79 by the compressed air within the bellows 81 and by the spring 83 balanced, an increase in the pressure of the control air within the tube 57 will cause an increase in the pressure of the air within the bellows and will cause the bellows to expand and to move the valve toward the venting port 76. This movement of the valve 77 will effect an increase in the pressure within the chamber 74 and air will flow through the passageway 75 and the tube 56 to increase the pressure within the chamber 68 of the fluid motor 48. The diaphragm 69 will thereupon move in a direction to further compress the spring 72 and the operating plunger 49 will move the link 92, the link 91, pivoted arm 89 and its attached roller 88 in a direction to effect movement of the pivoted arm 87 to further compress the spring 83. Movement of the valve 77, therefore, not only effects movement of the operating plunger 49 but also effects an increase in the compression of the spring 83 to balance the increased force exerted on the closure plate 79 by the compressed air within the bellows 81 so as to restore a condition of balance to the forces acting on the closure plate.

By reference to Fig. 3, it will be noted that the roller 88 is mounted on the pivoted arm 89 for movement longitudinally of the latter in a slot 93 so that the distance between the roller and the pivot point of its associated arm and the distance between the roller and the pivot point of the arm 87 may be varied to cause the movement of the free end portion of the arm 87 to be increased or decreased in relation to a given increment of movement of the operating plunger 49. Since the movement of the free end portion of the arm 87 acting through the spring 83 returns the closure plate 79 to its balanced condition, adjustment of the position of the roller 88 along the slot 93 will cause a greater or lesser amount of movement of the operating plunger 49 for a given amount of change or movement of the valve 77.

Referring now to Fig. 5 and assuming that the operating plunger 49, arm 89 and the arm 87 are in a position to provide a desired normal operating condition, the force exerted by the spring 83 on the closure plate 79 of the bellows 81 may be varied by axial adjustment of the collar 84 along the bushing 85. In other words, the forcing exerted by the spring 83 can be made to balance a selected control air pressure in the bellows 81 while the fluid motor 48 maintains its operating plunger 49 in a given selected position. For example, the force exerted by the spring 83 may be made to balance the control air pressure within the bellows 81 when the latter pressure is at the mid-point of its range of values and while the operating plunger 49 is in a position to provide a normal discharge rate for the rotary gate 26.

Referring now to Figs. 8, 9 and 10 for a detail description of the manner in which the control instrument 58 is connected into the control circuit, and first particularly referring to Fig. 8, it will be noted that the supply of compressed air flowing through the pressure regulator 53 and the tube 59 may enter either of two branch ducts 94 or 95 for flow to a transfer switch 96. The branch duct 94 leads directly to the transfer switch 96, while the branch duct 95 has connected therein a pressure regulator 97 and a pressure indicating gauge 98. With the transfer switch 96 in the position indicated in Fig. 8, the branch duct 95 is connected to a port 99 of the transfer switch which is closed so that no air will flow through this branch duct. The branch duct 94, however, is connected to a port 101 of the transfer switch 96 which port communicates through a passageway 102 within the switch with a port 103. The port 103 of the transfer switch 96 is connected through a tube 104 to a pilot relay 105, the function of which is to supply air at a controlled pressure in accordance with the operation of a control unit 106. A pressure indicating gauge 107 is provided for the tube 104 and a second pressure indicating gauge 108 communicates with the pilot relay 105 to indicate the pressure of the control air supplied by the pilot relay through a tube 109. The tube 109 is connected to a port 111 of the transfer switch 96 and, with the transfer switch in the position indicated in Fig. 8, communicates through a passageway 112 with the port 113 of the switch. The port 113 is connected to the tube 57 through which control air is supplied to the actuation controller 55 of the fluid motor 48, see Figs. 1 and 2.

With the transfer switch 96 positioned as indicated in Fig. 8, it will be readily apparent that the compressed air flowing through the pressure regulator 53, tube 59, branch duct 94, transfer switch 96 and tube 104 will enter the pilot relay 105 where its pressure will be regulated in accordance with the operation of the control unit 106 and the pressure of the control air will be applied through the tube 109, transfer switch and tube 57 to the actuation controller 55, see Figs. 3 and 4. The structure and operation of the pilot relay 105 and control unit 106 will be fully described at a later point, but it will be noted at this time that, with the transfer switch 96 positioned as indicated in Fig. 8, these two elements will function to automatically control the pressure in the tube 57.

Referring now to Fig. 9, it will be noted that the position of the transfer switch 96 has been changed to permit manual control of the pressure of the air in the tube 57. In the illustrated position of the transfer switch the port 99, to which the branch duct 95 is connected, is placed in direct communication with the port 113 through a passageway 114 so that the pressure of the air in the tube 57 may be adjusted by operation of the pressure regulator 97 to a value, as indicated by the gauge 98, see Figs. 1 and 2, which will provide the desired positioning of the operating rod 49 of the fluid motor 48. During periods of manual operation as described above, the pilot relay 105 is supplied with air through the branch duct 94, passageway 102 and tube 104 and will continue to regulate the pressure of the air in the tube 109 in accordance with the operation of the control unit 106. The tube 109 is closed at the port 111 of the transfer switch 96, but the gauge 108 indicates the proper control air pressure so that the pressure regulator 97 may be manually regulated to maintain the pressure reading of the gauge 98 substantially equal to that indicated by the gauge 108.

The position of the transfer switch illustrated in Fig. 10 is identical to that of the switch as illustrated in Fig. 9 except that the ports 101 and 103 of the transfer switch are closed to completely cut off all flow of air to the pilot relay 105. In this position of the transfer switch 96, therefore, manual operation of the control system may be continued at a selected control air pressure while the pilot relay 105 or control unit 106 are being serviced or replaced.

Figs. 12, 13 and 14 illustrate the structure of the transfer switch 96 which includes a housing 115 having the ports 99, 101, 103, 111 and 113 formed therein and a rotatable plug 116 which is externally slotted to provide the longitudinal passageways 102, 112 and 114. These passageways are so located on the surface of the plug that, when the transfer switch 96 is set for automatic operation, as illustrated in Figs. 8 and 12, the passageway 102 is aligned with and connects the inner ends of the ports 101 and 103 and the passageway 112 is aligned with and connects the inner ends of the ports 111 and 113. The passageway 102 extends circumferentially around a portion of the plug 116 so that when the plug is rotated to the manual position illustrated in Figs. 9 and 13, the passageway 102 will remain in alignment with and will connect the inner ends of the ports 101 and 103, while the passageway 112 will have been moved out of alignment with its associated ports 111 and 113 and passageway 114 will have been aligned with and will connect the inner ends of the ports 99 and 113. Further rotation of the plug 116 to the service position illustrated in Figs. 10 and 14 will move the passageway 102 out of alignment with its associated ports 101 and 103, the passageway 112 remaining out of alignment with its associated ports 111 and 113 and the passageway 114 having a sufficient circumferential dimension to remain in alignment with and connect the ports 99 and 113.

The structure of the two pressure regulators 53 and 97 and their operation are identical and will be described in detail as follows:

As illustrated in Fig. 11, air flowing through the tube 52 enters the pressure regulator 53 and flows through a passageway 117 to a supply port 118. Extending through the supply port 118 is a valve stem 119 which carries a valve 121 at one end thereof for opening and closing the supply port and a valve 122 at the opposite end thereof. A spring 123 applies a very light force to the valve 122 in a direction to urge the valve 121 into closing relationship with the supply port 118. Adjacent to valve 122 there is provided an exhaust port 124 which is formed in an eyelet 125 carried by the flexible diaphragm 126 for engagement with the valve 122. A chamber 127 is provided adjacent the inner surface of the diaphragm 126 and communicates through a passageway 128 with the tube in which the pressure of the air is to be regulated. A spring 129 is compressed between the outer side of the diaphragm 126 and a spring seat 131 which is axially adjustable by rotation of a manual set screw 132. The air adjacent the outer surface of the diaphragm 126 is maintained at atmospheric pressure by vents 133.

Considering now the manner in which the pressure regulator 53 functions to maintain the pressure in the chamber 127 and passageway 128 at a fixed, constant value, it will be noted that the pressure of the air acting on the inner surface of the diaphragm 126 is balanced against the force exerted on the diaphragm by the spring 129. With the adjusting screw 132 at a given position and the pressure of the air in the chamber 127 at a value corresponding to the position of the set screw 132, therefore, the forces on opposite sides of the diaphragm 126 will be balanced and the valve 121 will be positioned relative to the supply port 118 to provide an opening through the supply port just large enough to maintain the regulated air pressure at the selected value.

Any change in the consumption of the air flowing from pressure regulator 53 will thereafter tend to create an unbalanced condition in the forces acting on the diaphragm 126 so that the diaphragm will effect movement of the eyelet 125, valve 122 and valve 121 in a direction to compensate for the change. This movement of the valve 121 will increase or decrease the flow of air through the supply port 118 by an amount equal to the increase or decrease in the consumption of air and the diaphragm 126 will assume a new position at which the pressure within the chamber 127 is balanced by the force of the spring 129, the pressure in the chamber being thereby maintained at its preselected value. It will be noted that during the above described operation of the pressure regulator 53, the exhaust port 124 will remain closed as a result of engagement of the eyelet 125 by the valve 122.

If it becomes desirable to increase or decrease the regulated air pressure within the chamber 127, this adjustment may be made by manual rotation of the set screw 132. When the screw 132 is rotated in a direction to increase the compression of the spring 129, the forces acting on the diaphragm 126 will become unbalanced and the eyelet 125 will move the valve 121 in a direction to increase the flow of air through the supply port 118 until the pressure in the chamber 127 reaches a value at which the forces acting on the diaphragm are again balanced. If, on the other hand, the pressure in the chamber 127 is to be reduced, the set screw 132 is rotated in a direction to decrease the compression of the spring 129 and the pressure of the air within the chamber will cause movement of the diaphragm 126 in a direction to cause the valve 121 to close the supply port 118. Further, the eyelet 125 will be lifted out of engagement with the valve 122 so that the excess air within the chamber 127, passageway 128 and tube connected to the latter will be vented through the exhaust port 124 until the pressure within he chamber is reduced to a value at which the forces on the diaphragm 126 are again balanced. The exhaust port 124 will thereupon be closed by the valve 122 and the valve 121 will be moved to a position at which the flow of air through the supply port 118 is just sufficient to maintain the air pressure in the chamber at the new value.

Referring now to Fig. 15 for a detail description of the structure and operation of the pilot relay 105 which functions to regulate the pressure of the control air in the tube 109, air enters the pilot relay from the tube 104 which is in open communication with passageways 134 and 135 within the pilot relay. Air flowing through the passageway 135 passes through a filter 136 carried by a plug 137 and enters the chamber 138 within the restriction screw 139 through a port 141. The inner end of the restriction screw 139 is seated across a passageway 142 and a restriction tube 143 extends from within the chamber 138 into the passageway 142 to permit the controlled flow of air into the passageway. Air from the passageway 142 fills the space within the housing 144 around the outer bellows 145 and flows through a branch passageway 146 to the control unit 106 which functions to control the pressure in the passageway 146, passageway 142 and the space between the bellows 145 and housing 144, as will be later described.

The passageway 134 terminates at an inlet port 147 in the chamber 148. The chamber 148 communicates through a tube 149 with the gauge 108 which indicates the regulated air pressure within the chamber. Mounted within the chamber 148 for movement into and out of sealing engagement with the port 147 is a flapper type valve 151 carrying a resilient pad 152 for sealing engagement with the port 147 and urged into engagement with the port by a spring 153. The chamber 148 is in open communication with the passageway 154 which is, in turn, in open communication with the tube 109 and a second tube 155 for applying the control air pressure to the control unit 106, as will be later described.

An exhaust port 156 is mounted on the end plate 157 of the bellows 145 for movement therewith and extends through a guide 158 into the chamber 148. The port 156 is provided with a longitudinally extending passageway 159 the inner end of whch is movable into engagement with the pad 152 of the flapper valve 151 and the outer end of which is connected by a radial passageway 161 to the space between the outer bellows 145 and inner bellows 162. The space between the bellows 145 and 162 is in open communication with the atmosphere and will be maintained at atmospheric pressure. The space within the inner bellows 162, however, is in communication only with the chamber 148 so that the pressure within the bellows will at all times correspond to that within the latter chamber.

Referring still to Fig. 15 for a detail description of the manner in which the pilot relay 105 functions to regulate the pressure of the air in the tube 109, and recalling that the pressure of the air in the tube 104 is maintained at a constant value by the pressure regulator 53, a portion of the air from the tube 104 will flow through the passageway 135, filter 136, port 141 and restriction tube 143 of the screw 139 into the passageway 142. From the passageway 142, air will be released through the tube 146 at a variable rate, as will be later described, and the pressure within the space between the outer bellows 145 and the housing 144 will vary in inverse relationship with the rate at which the air is released through the tube 146. In other words, the tube 146 having an internal diameter substantially greater than that of the restriction tube 143, the free flow of air through the tube 146 will reduce the pressure on the outer bellows 145 to substantially atmospheric pressure. On the other hand, the flow of air through the tube 146 may be restricted to a sufficient extent to cause the pressure of the air on the outer bellows 145 to increase to a value of, for example, four pounds per square inch.

The pressure of the air in the tube 104 is also applied throughout the length of the passageway 134 so that air will flow through the inlet port 147 when the pad 152 of the flapper valve 151 is moved away from its position across the inlet port. Since the cross sectional area of the passageway through the inlet port 147 is quite small, however, the spring 53 will hold the pad 152 in sealing relationship with the port by applying a very small force to the flapper valve 151. The flapper valve 151 is moved to open and close the inlet port 147 by the exhaust port 156 which is guided for movement toward and away from the flapper valve by the guide 158 and which assumes a position in accordance with the relationship between the pressures acting on the outer bellows 145 and on the inner bellows 162, the latter bellows being subjected to the pressure of the air in the chamber 148.

The effective surface areas of the outer bellows 145 and inner bellows 162 may be considered as being those areas which when subjected to pressure tend to cause longitudinal movement of the bellows. The bellows 145 has an effective surface area equal to five times that of the bellows 162. In other words, the pressure acting on the outer bellows 145 will be balanced by a pressure five times as great as acting on the inner bellows 162.

Assuming then that the pressure of the air acting on the outer bellows 145 and the pressure of the air acting on the inner bellows 162 bear a ratio of one to five, respectively, that the exhaust port 156 is in engagement with the pad 152 of the flapper valve 151, and that the inlet port 147 is also sealed by engagement with the pad, a variation in the rate of flow of the air through the tube 146 will cause a corresponding variation in the pressure acting on the outer bellows 145. If the pressure of the air acting on the outer bellows 145 is increased, the outer bellows will contract and will move the exhaust port 156 to cause the flapper valve 151 to move the pad 152 away from the inlet port 147. Air will then flow into the chamber 148 through the inlet port 147 and the pressure of the air in the chamber 148, the passageway 154 and tube 109 will increase until the pressure within the chamber reaches a value five times as great as that pressure acting on the outer bellows. During this incease in the pressure within the chamber 148, the pressure acting on the inner bellows 162 will cause a reversal in the direction of movement of the exhaust port 156 to return the flapper valve 151 to a position at which the pad 152 will again seal the inlet port 147.

If the restriction to the flow of air through the tube 146 is reduced or removed, the pressure acting on the outer bellows 145 will decrease so that the pressure within the chamber 148 acting on the inner bellows 162 will cause the exhaust port 156 to move away from its position of engagement with the pad 152 of the flapper valve 151. Air from the chamber 148 will thereupon be released through the passageway 159 in the exhaust port and through the radial passageway 161 to the space between the bellows 145 and 162 which is maintained in atmospheric pressure. This flow of air from the chamber 148 will continue until the pressure within the chamber, passageway 154 and tube 109 is reduced to a value five times as great as that pressure acting on the outer bellows 145. During this reduction of pressure within the chamber 148 the pressure acting on the outer bellows 145 will cause a reversal in the direction of movement of the exhaust port 156 so that the exhaust port will again be seated against the pad 152 of the flapper valve 151 when the pressures acting on the outer bellows 145 and inner bellows 162 are returned to a ratio of one to five, respectively.

From the above description of the operation of the pilot relay 105, it will be readily apparent that the control air pressure within the chamber 148, passageway 154 and tube 109 will vary in a direct relationship with and at a value equal to five times that of the pressure acting on the outer bellows 145 which, in turn, is regulated by varying the rate of flow through the tube 146. It will also be noted that the tube 155 is in open pressure communication with the chamber 148, passageway 154 and tube 109 so that the pressure within the tube 155 will at all times equal the control air pressure. The pressure of the air within the tube 155 functions in connection with the control unit 106 for regulating the flow of air through the tube 146 and will be later described.

Referring now to Figs. 16, 17 and 18 for a detail description of the control unit 106 for regulating the flow of air through the tube 146 in accordance with the responses of the measuring device 61 to variations in the pressure of the air in the upper portion of the rear longitudinal section of the wash box 21, and first referring to Figs. 16 and 17, it will be noted that the tube 146 terminates at a nozzle 163 through which air is discharged from the tube 146 to the atmosphere. Mounted on a frame 164 for pivotal movement about a pin 165 is a flapper 166, the free end portion of which extends across the nozzle 163. The flapper 166 is urged toward the nozzle 163 by a light spring 167 and the position of the flapper relative to the end of the nozzle will determine the extent to which the flow of air from the nozzle is restricted and, therefore, the pressure of the air acting on the outer bellows 145 of the pilot relay 105.

The flapper 166 is moved to and held at varying distances from the end of the nozzle 163, against the force exerted by the spring 167, by a pin 168 mounted on the flapper lifting arm 169. This arm 169 is mounted for pivotal movement on a pin 171 that is carried by the free end portion of a lever arm 172 the opposite end portion of which is pivotally mounted on the frame 164 by a pin 173. The arm 172 is biased in a direction to move the pin 171 toward the nozzle 163 by a spring 174. The pin 168, therefore, may be moved to adjust the position of the flapper 166 either by pivotal movement of the flapper lifting arm 169 about the pin 171, by movement of the pin 171 to reposition the flapper lifting arm, or by the combined pivotal movement of the flapper lifting arm about the pin 171 while the latter is moved relative to the nozzle 163.

Since a very slight movement of the flapper 166 will cause a variation of the pressure of the air in the tube 146 between its maximum and minimum values, and since it is desirable to adjust the pressure within the tube 146 to values between its maximum and minimum which are proportional to the variations in the pressure measuring device 61, the position of the flapper 166 is varied by pivotal movement of the flapper lifting arm 169 in accordance with the variations in the pressure applied to the pressure measuring device 61 and by a repositioning of the pin 171 in accordance with the resulting change in the pressure of the control air. The flapper lifting arm 169 is pivoted about the pin 171 by a control link 175 which is connected to and operated by the differential linkage 176 illustrated in Fig. 18.

The differential linkage 176 includes a floating link 177 the middle portion of which is pivotally connected to the control link 175 and the opposite end portions of which are supported for pivotal movement relative to each other. One end portion of the link 177 is pivotally connected by a stub shaft 178 to a toothed segment 179 mounted on the outer end of an arm 181 for pivotal movement about a shaft 182 by rotation of a pinion 183 which meshes with the teeth of the segment 179. Also mounted on the shaft 182 for limited pivotal movement relative to the arm 181 is an index arm 184. The position of this last mentioned arm is adjustable relative to the arm 181 by rotation of an indexing device 185 the middle portion of which passes through a slot 186 in the index arm 184 and the eccentrically formed end portion of which is journaled in the arm 181. It will be readily apparent that rotation of the indexing device 185 will effect limited pivotal movement of the index arm 184 while the toothed segment and its mounting arm 181 remain in a given selected position.

The opposite end of the floating link 177 is connected through a link 187 to the outer end portion of an arm 188 which extends radially from the pivotally supported pointer shaft 189. The arm 188 is rotatable with the shaft 189 to effect pivotal movement of the link 177 about the pin 178. The pointer shaft 189 is rotated by a pointer shaft lever 191 one end portion of which is rigidly connected to the shaft and a spaced portion of which is connected through a connecting link 192 to the calibration slider 193 of the pressure measuring device 61, as illustrated in Fig. 2. The point of connection between the connecting link 192 and the calibration slider 193 is movable by rotation of the calibration screw 194 to properly position the pointer shaft lever 191 for a given position of the calibration slider.

A pointer 195 is also mounted on the pointer shaft 189 for movement therewith and is provided with a zero adjusting screw 196 by means of which the arm can be moved pivotally about the pin 197 on the mounting bracket 198. In other words, the position of the pointer 195 can be adjusted to a limited extent while the pointer shaft 189 is held in a given position.

Referring now to Fig. 18 for a detail description of the manner in which the differential linkage 176 functions to transmit the responses of the measuring device 61 to the control link 175, it will be noted that the pointer arm 195 and pointer shaft lever 191 are both rigidly connected to the pointer shaft 189 so that the pointer arm will assume a given position for each position to which the pointer shaft lever is moved by the connecting link 192. Since the pressure measuring device 61 will be subjected to a fixed range of pressures and will cause movement of the calibration slider 194 through a path corresponding to the pressures within the range, the connecting link 192 between the calibration slider and the pointer shaft lever 191 can be so connected to the pointer shaft lever and calibrated by means of the calibration screw 193 that movement of the calibration slider through the path corresponding to the range of pressures to which the measuring device is subjected will effect movement of the pointer arm 195 from one end of a suitable indicating scale to the other. Further, the index arm 184 may be mechanically aligned with the pointer arm 195 by rotation of the adjusting device 185 while the toothed segment 179 is held in a position corresponding to that of the pointer arm.

It will be readily apparent that movement of the pointer shaft lever 191 to rotate the shaft 189 and impart angular movement to the pointer arm 195 will effect a similar angular movement of the arm 188 which is connected by the link 187 to the floating link 177. Rotation of the pinion 183 to impart angular movement to the toothed segment 179 and its arm 181 will effect angular movement of the index arm 184 and will also move the end of the floating link 177 which is connected to the toothed segment by the pin 178. The floating link 177, therefore, will be moved with the movement of either the pointer arm 195 or the index arm 184 and, since movement of the index and pointer arms in the same angular direction will cause one end of the link 177 to be raised while the opposite end is lowered, the control link 175 will remain in substantially a fixed position for so long as the two arms are mechanically aligned.

The index arm 184, therefore, may be positioned by rotation of the pinion 183 to any selected point within the range of values of the pressure to be measured by the pressure measuring device 61. When the pressure measuring device is subjected to that pressure, the pointer arm 195 will be aligned with the index arm and the control link 175 will be moved to a given corresponding position. Any deviation from the selected value of the pressure measured by the pressure measuring device 61, will cause the pointer arm 195 to move away from its position of alignment with the index arm 184 and will cause movement of the floating link 177 and the control link 175. In this manner, the differential linkage 176 transmits the pressure variations measured by the pressure measuring device 61 to the control link 175 to cause pivotal movement of the flapper lifting arm 169 to move the flapper 166. Further, increases in the pressure measured by the pressure measuring device 61 will cause counterclockwise movement of the pointer arm 195 and the arm 188 to lower the end portion of the link 177 which is connected to the arm 188 by the link 187 and to thereby lower the control link 175. Decreases in the pressure measured by the pressure measuring device 61 will act in a converse manner to raise the control link 175.

Referring once again to Fig. 16, it will be noted that movement of the control link 175 in an upward direction in response to decreases in the pressure measured by the pressure measuring device 61, will cause the pin 168 to engage the flapper 166 and move the latter away from the nozzle 163. This movement of the flapper 166 away from the nozzle 163 will cause the pressure in the tube 146 to be reduced and the pilot relay 105 will thereupon function to reduce the regulated pressure of the control air in the tube 109 and in the tube 155, as was previously described. Conversely, movement of the control link 175 in a downward direction in response to increases in the pressure applied to the pressure measuring device 61 will cause the pin 168 to move in a direction to permit the flapper 166 to move toward the nozzle 163 to increase the pressure in the tube 146. The pilot relay 105, will respond to this increase in the pressure of the tube 146 to increase the pressure of the control air in the tube 109 and in the tube 155.

Since a very slight movement of the flapper 166 will effect variations in the pressure in the tube 146 through a complete range of values, a very slight movement of the control link 175 would effect variation in the pressure of the control air in the tube 109 and in the tube 155 through a complete range of values if no provision were made for a compensating adjustment of the pivot pin 171 for the flapper lifting arm 169. This compensating adjustment of the position of the pin 171 is made in accordance with the pressure of the control air supplied by the pilot relay 105 through a mechanism which will be described in detail as follows:

The pressure of the control air as regulated by the pilot relay 105 is applied through the tube 155 to the follow-up bellows 199 within the housing 201. The end plate 202 of the bellows 199 has connected thereto an operating rod 203 and a spring 204 is compressed within the bellows. The forces applied to the bellows 199 by the spring 204 are balanced by the equal and opposed forces of a second spring 205 which is compressed against a spring seat 206 carried by the rod 203. The rod 203, therefore, will move axially in response to any variations in the pressure within the housing 201 which act upon the bellows 199.

At the outer end of the rod 203, a pin 207 projects radially outwardly and engages one edge of a reset cam 208 which is pivotally supported by a pin 209 carried by a reset lever 211. This lever is mounted for pivotal movement about a pin 212 and is pivoted by rotation of the pinion 213 which engages the arcuate rack 214 on the reset lever. The edge of the reset cam opposite the pin 207 engages a pin 215 that is mounted on a reset arm 216 carried for pivotal movement by a pin 217 on the frame 164. Engaging the edge of the reset arm 216 on the side thereof away from the reset cam 208 is a pin 218 mounted at the free end portion of the proportional band adjustment arm 219 the opposite end portion of which is carried by a pin 221 mounted on the proportional plate 222. This plate is mounted for vertical movement along a guide plate 223 the side edges of which are engaged by guide members 224 on the proportional plate. Vertical movement is imparted to the proportional plate 222 by a pinion 225 which meshes with the rack 226 formed along one edge of the proportional plate. A tapered plug 227 passes through a slot in the proportional plate 222 and is urged into tight engagement with the slot by a spring 228 to hold the proportional plate in the positions to which it is moved by the pinion 225. On the opposite side of the pin 218 from its engagement with the reset arm 216, the pin is engaged by the arm 172 upon which the pin 171 carrying the flapper lifting arm 169 is mounted.

Recalling that the arm 172 is urged in a direction to move the pin 171 toward the nozzle 163 so that the pins 207, 215 and 218 will at all times be maintained in engagement with the reset cam 208, reset arm 216 and the arm 172, respectively, any movement of the rod 203 will be transmitted from the pin 207 through the reset cam 208, pin 215, reset arm 216 and pin 218 to the arm 172 which will be moved to swing the pin 171 toward and away from the nozzle 163. The width of the reset cam 208 varies along its length so that pivotal movement of the reset lever 211 by rotation of the pinion 213 will vary the space between the pins 207 and 215. In other words, for a given position of the rod 203, the position of the reset arm will vary in accordance with the position of the reset lever 211 and the cam 208. Further, vertical movement of the proportional plate 222 by rotation of the pinion 225 will cause the pin 218 to move toward and away from the pin 217 about which the reset arm 216 is pivoted and away from and toward, respectively, the pin 173 about which the arm 172 is pivoted so that the extent of movement of the pin 171 carried by the arm 172 for a given amount of movement of the rod 203 may be varied.

Assuming then that the control link 175 has been located at a given position by the differential linkage 176, which position corresponds to a given pressure applied to the pressure measuring device 61, the pressure of the control air in the tube 155 and housing 201 may be varied in accordance with the setting of the reset cam 208. In other words, for a given position of the control link 175, there will be a specific control air pressure within the tube 155 and housing 201. The pressure of the control air, however, may be adjusted by rotation of the pinion 213 to effect pivotal movement of the reset lever 211 and movement of the reset cam 208 to vary the distance between the pins 207 and 215 which will, in turn, cause movement of the pin 171 supporting the flapper lifting arm 169 and will reposition the flapper 166. For a given setting of the reset cam, however, it may be stated that the control air pressure in the tube 155 and housing 201 will vary in direct proportion to variations in the measured pressure applied to the pressure measuring device 61.

While the variations in the pressure of the control air are proportional to the deviations of the pressure measured by the pressure measuring device 61 from the selected control point, a variation of, for example, ten percent in the range of measured pressures may effect a one-hundred percent variation in the range of the control air pressures. The percent of deviation within the full range of the measured pressures which will effect a full range variation in the control air pressures is called the throttling range and is adjusted by rotation of the pinion 225 to move the pin 218 to various positions between the reset arm 216 and the arm 172. In other words, when the pin 218 is moved upwardly between the reset arm 216 and the arm 117 away from the pin 217 and toward the pin 173, the throttling range will increase. An increase in the pressure measured by the pressure measuring device 61 equal to ten percent of the total range of measured pressures might, for example, cause the flapper 166 to be moved by the combined action of the control link 175 and bellows 199 to a position at which the new control air pressure would be increased by an amount equal to ten percent of the total range of control air pressures. Since the percent variation in the measured air pressure is equal to the percent variation in the control air pressure of the above example, the throttling range would be equal to one-hundred. If, on the other hand, the pin 218 were moved downwardly by rotation of the pinion 225, a ten percent increase in the measured air pressure would produce an identical movement of the control link 175 but the compensating action of the bellows 199 would be reduced so that the control air pressure might increase by an amount equal to fifty percent of the total range of control air pressures. In this latter example, a twenty percent variation in the measured pressure would effect a full range variation in the control air pressure and the throttling range would be twenty.

The operation of the various component parts of the control system for the wash box 21 has been described above in detail. The operation of the entire control system, however, can best be understood by reference to Figs. 1 and 2 and will be described in detail as follows:

Recalling that the pressure of the air in the upper portion of the rear longitudinal section of the wash box 21 will vary in accordance with the resistance of the bed of material B to the flow of water therethrough, the pressure measuring device 61 is placed in communication with the air space in the wash box during like portions of successive pulsations by the intermittent actuation of the solenoid operated valve 63 which opens and closes the tube 62. Variations in the thickness of the strata of heavy gravity particles in the bottom of the material bed B, therefore, will cause the pressure measuring device 61 to position the calibration slider 193 in different positions according to the thickness of the strata. These different positions of the calibration slider 193 correspond to and are visably indicated by the pointer 195 of the differential linkage 176.

If the thickness of the strata of heavier gravity particles in the material bed B is to be maintained at a given value, the pressure measured by the device 61 may be maintained at a value corresponding to this particular thickness by operating the fluid motor 48 to maintain the rate of discharge of material through the gate 26 equal to the rate of accumulation of the heavier gravity particles in the bed of materials. The index arm 184, therefore, may be positioned at a set point corresponding to the value of the desired pressure and, with the pointer arm 195 aligned with the index arm 184, the flapper 166 of the control unit 106 will cause the pressure in the tube 146 to maintain the control air pressure at a value at which the fluid motor 48 will be positioned to provide a normal or average rate of rotation for the gate 26.

Assuming then that the thickness of the stratum of heavy gravity particles in the bottom of the wash bed deviates from its selected value, the pressure measured by the device 61 will deviate from the value indicated by the index arm 184 and the control link 175 will effect an adjustment in the position of the flapper 166. The pilot relay 105 will thereupon change the pressure of the control air applied to the actuation controller 55 so that the position of the fluid motor 48 will be adjusted to vary the rate of discharge of material through the refuse gate 26. The extent to which the rate of discharge is adjusted by a given deviation in the pressure measured by the pressure measuring device 61 will, of course, depend upon the setting of the throttling range of the control unit 106. In any event, however, the refuse gate 26 will continue to operate at its adjusted rate until the thickness of the stratum of heavier gravity particles has been returned to its selected value and the pressure applied to the pressure measuring device 61 returns to the value indicated by the index arm 184.

If the rate of accumulation of heavy gravity particles in the material bed B continues to exceed the rate of discharge of such particles by the refuse gate 26 when the latter is operating at its normal speed, it will be readily apparent that the refuse gate must be operated at a faster rate and, therefore, the pressure applied to the pressure measuring device 61 must remain at a higher value than the selected control value mentioned above. The position of the pointer 195, therefore, will not coincide with that of the index arm 184, and the thickness of the stratum of particles will be maintained at a constant value above the selected value. An adjustment of the reset cam 108 is necessary to return the measured pressure and the thickness of the stratum to their desired values while maintaining the rate of operation of the refuse gate 26 at the higher value necessary to accommodate the greater rate of accumulation of heavier gravity particles.

It is to be understood that the form of this invention shown and described is to be taken as a preferred example of the same, and that various changes in the shape, size and arrangement of parts may be resorted to without departing from the spirit of the invention or the scope of the subjoined claims.

Having thus described the invention, we claim:

1. In a device of the type described, the combination with a wash box having a bed of material therein adapted to be acted upon by a body of washing liquid, means for introducing air into and exhausting it from an enclosed space above said washing liquid to produce a pulsating flow of the latter through said bed of materials, a rotary gate for discharging materials from said box, and drive means for rotating said gate to effect such discharge of materials, of pressure responsive means operatively associated with said enclosed space for response to variations in the air pressure therein which are directly related to changes in the hydraulic resistance of the material bed, means for varying through a continuous range the rate at which said drive means rotates said gate to regulate the rate of discharge of materials from said box, and means operated by said pressure responsive means for controlling the operation of said rate varying means in accordance with the changes in the hydraulic resistance of the material bed to maintain the hydraulic resistance at a substantially constant value.

2. A device as defined in claim 1, further characterized by said pressure responsive means comprising means forming a chamber, means for providing communication between said chamber and said enclosed space only during a minor portion of each period during which air is admitted to the enclosed space, and a pressure measuring device responsive to the pressure in said chamber, said chamber being closed to maintain a constant pressure therein between said minor portions of the air admission periods, and the pressure in said chamber varying during successive minor portions of the air admission periods in direct proportion to changes in the hydraulic resistance of the material bed.

3. In a device of the type described, the combination with a wash box having a bed of materials therein adapted to be acted upon by a body of washing liquid, means for introducing air into and exhausting it from an enclosed space above said washing liquid to produce a pulsating flow of the latter through said bed of materials, a rotary gate for discharging materials from said box, and drive means for rotating said gate to effect such discharge of materials, of pressure responsive means, additional means for putting said pressure responsive means in open communication with said enclosed space during like portions of successive pulsations of the washing liquid for operation in response to variations in the air pressure in said space which are proportional to changes in the hydraulic resistance of the material bed, motor means for varying through a continuous range the rate at which said drive means rotates said gate, and means operated by said pressure responsive means for controlling the operation of said motor means to maintain the rate of rotation of said gate at a value at which the hydraulic resistance of the bed will remain substantially constant.

4. A device as defined in claim 3 further characterized by said additional means comprising means forming a passageway between said enclosed space and said pressure responsive means, a valve in said passageway, and means for opening said valve only during like portions of successive pulsations of the washing liquid to place said pressure responsive means in open communication with said enclosed space only when the pressure in said space is proportional to the hydraulic resistance of the material bed.

5. A device as defined in claim 3 further characterized by said additional means comprising a pipe providing a passageway between said enclosed space and said pressure responsive means, a valve for opening and closing said pipe, and a valve operating device actuated in timed relationship with said means for introducing air into and exhausting it from said enclosed space to open said pipe only during like portions of successive pulsations of the washing liquid.

6. In a device of the type defined, the combination with a wash box having a bed of materials therein adapted to be acted upon by a body of washing liquid, means for introducing air into and exhausting it from an enclosed space above said washing liquid to produce a pulsating flow of the latter through said bed of materials, a rotary gate for discharging materials from said box, and drive means for rotating said gate to effect such discharge of materials, of means for measuring the air pressure in said enclosed space during like portions of successive pulsations of the washing liquid, said measured air pressure varying in a direct relation to the hydraulic resistance of the material bed, means including a fluid motor for varying through a continuous range the rate at which said drive means rotates said gate, means for supplying pressure fluid to operate said fluid motor, and means operated by said pressure measuring means for regulating said pressure fluid supply means to cause said fluid motor to maintain the rate of rotation of said gate at a value at which the hydraulic resistance of the bed will remain substantially constant.

7. A device as defined in claim 6 further characterized by said pressure measuring means including means forming a chamber, a pipe providing a passageway between said enclosed space and said chamber, a valve for opening and closing said passageway, a solenoid actuated in timed relationship with the admission of air to said enclosed space for opening said valve during like portions of successive pulsations of the washing liquid, and a member movable in response to variations of the pressure in said chamber for operating the pressure fluid supply regulating means.

8. A device as defined in claim 6 further characterized by the means for regulating the pressure fluid supply means comprising a pressure fluid operated valve, piping for supplying the pressure fluid to operate said valve, and means operated by said pressure measuring means for controlling the introduction of pressure fluid to and the release of pressure fluid from said piping to adjust the position of said valve and to regulate the supply of pressure fluid to said fluid motor in accordance with variations in the hydraulic resistance of the material bed.

9. A device as defined in claim 6 further characterized by the means for regulating the pressure fluid supply means comprising a pressure fluid operated actuation control valve, piping for supplying pressure fluid to operate said control valve, a pressure fluid operated pilot valve for admitting pressure fluid to and releasing pressure fluid from said piping to adjust the position of said control valve, and a control unit operated by said pressure measuring device for regulating the pressure of the fluid for operating said pilot valve to cause the latter to vary the pressure of the fluid in said piping in accordance with variations in the hydraulic resistance of the material bed.

10. A device as defined in claim 9 further characterized by means associated with said control unit for adjusting the pressure of the fluid for operating said pilot valve relative to the pressure measured by said pressure measuring device, and separate means for adjusting the extent to which the pressure in said piping is varied by said pilot valve relative to a given variation in the measured pressure.

11. In a device of the type defined, the combination with a wash box having a bed of materials therein adapted to be acted upon by a body of washing liquid, means for introducing air into and exhausting it from an enclosed space above said washing liquid to produce a pulsating flow of the latter through said bed of materials, a rotary gate for discharging materials from said box, and drive means for rotating said gate to effect such discharge of materials, of a pressure responsive device communicating with said enclosed space so as to measure the air pressure therein during like portions of successive pulsations of the washing liquid, means including a fluid motor for varying through a continuous range the rate at which said drive means rotates said gate, piping for supplying pressure fluid to operate said fluid motor, pneumatic control means operated by the responses of said pressure responsive device for automatically maintaining the pressure of the fluid in said piping in a predetermined relationship with said measured air pressure, manually operated means for regulating the pressure of the fluid in said piping, and a transfer valve in said piping for selectively connecting said piping to said pneumatic control means or to said manually operated means to allow the rate of rotation of said gate to be controlled automatically or manually as desired.

References Cited in the file of this patent

UNITED STATES PATENTS

| | | |
|---|---|---|
| 2,606,661 | Lotz | Aug. 12, 1952 |
| 2,742,153 | Lotz | Apr. 17, 1956 |